United States Patent

[11] 3,568,033

| [72] | Inventor | Laszlo Gyugyi |
| | | Penn Hills, Pa. |
| [21] | Appl. No. | 863,828 |
| [22] | Filed | Oct. 6, 1969 |
| [45] | Patented | Mar. 2, 1971 |
| [73] | Assignee | Westinghouse Electric Corporation |
| | | Pittsburgh, Pa. |

[54] APPARATUS AND METHOD FOR CYCLOCONVERTER BANK SELECTION
9 Claims, 7 Drawing Figs.

[52] U.S. Cl. .................................................. 321/7, 321/13, 321/66, 321/69
[51] Int. Cl. ................................................ H02m 1/08, H02m 5/14
[50] Field of Search ....................................... 321/7, 13, 18, 60, 61, 65, 66, 69

[56] References Cited
UNITED STATES PATENTS

| 3,178,630 | 4/1965 | Jessee.......................... | 321/7 |
| 3,293,448 | 12/1966 | Amato......................... | 321/13(UX) |
| 3,320,514 | 5/1967 | Lawrence...................... | 321/13(UX) |
| 3,467,850 | 9/1969 | Christiansen et al. ........ | 321/18 |
| 3,493,841 | 2/1970 | Amato et al. ................. | 321/18 |

*Primary Examiner*—William H. Beha, Jr.
*Attorneys*—F. H. Henson, C. F. Renz and M. P. Lynch

ABSTRACT: Invention comprises apparatus and method for controlling the transfer of conduction between positive and negative banks of a cycloconverter circuit relative to the zero crossover point of the fundamental component of the AC output current waveform of the cycloconverter to insure a continuous cycloconverter current.

PATENTED MAR 2 1971 3,568,033

WITNESSES:
Bernard R. Gregory
James F. Young

INVENTOR
Laszlo Gyugyi
BY Michael P. Lynch
ATTORNEY

3,568,033

APPARATUS AND METHOD FOR CYCLOCONVERTER BANK SELECTION

BACKGROUND OF THE INVENTION

A cycloconverter consists of a pair of inversely connected converter circuits, commonly referred to as positive and negative banks. The positive bank comprises a group of gate controlled switching elements, or valves, which supply positive load current, and the negative bank comprises a group of gate controlled switching elements, or valves, which supply negative load current. The valves of the respective banks receive firing pulses which are timed so that each bank delivers approximately the same mean terminal voltage.

The polarity of the output current of the cycloconverter is normally sensed by a current zero crossing detector. Since at the end of each half cycle the output current falls to zero, it may be thought by detecting these "zero points" that positive and negative current half cycles can be determined and by developing appropriate inhibiting signals for the firing pulses the positive and negative banks of the cycloconverter can be alternately operated. The main problem associated with this method is related to the fact that the output current of the cycloconverter is not a pure sine wave, that, aside from the fundamental component, the output waveform contains rippled harmonics with relatively high amplitudes. As a result, the output current may have several "zero crossing points" during each half cycle which could cause an irregular transfer of conduction from one converter bank to the other. Such an operation would result in a severe distortion in the output waveform.

Further distortion as well as loss of cycloconverter efficiency results from uncontrolled interbank circulating current produced by instantaneous voltage differences between the outputs of the converter banks.

While it is recognized that a continuous cycloconverter output current is required during the "zero crossing point" transfer of bank conductivity to provide optimum cycloconverter efficiency and minimum waveform distortion, efforts to date have not reconciled the interrelated effects of:
  a. nonsinusoidal current output waveforms of the cycloconverter;
  b. interbank circulating currents and
  c. cycloconverter load characteristics.

The transfer of bank conduction is generally accomplished by either an overlap, or nonoverlap mode of transfer.

The overlap mode provides a period at bank conduction transfer within which both converter banks are in a conductive state. This mode creates an interbank circulating current which, in the case of light cycloconverter loads provides desirable continuous cycloconverter currents but in the case of heavy cycloconverter loads results in output waveform distortion and inefficient operation.

The nonoverlap mode provides a period at transfer when neither converter bank conducts which, in the case of light cycloconverter loads results in undesireable discontinuity of cycloconverter current, while in the case of heavy loads, is acceptable inasmuch as the load condition is sufficient to insure continuity of cycloconverter current during the transfer of bank conduction.

SUMMARY OF THE INVENTION

The zero crossing points of the fundamental AC component of the converter output current waveform are utilized to control the transfer of conduction between the positive and negative banks of the converter to insure continuous cycloconverter current flow to the load. The magnitude and/or power factor of the cycloconverter load determines the mode of converter bank transfer, either overlap or nonoverlap, to insure continuous cycloconverter current during the transfer of bank conduction.

A bank selector circuit responds to the load characteristics, power factor and/or magnitude, to establish the bank conduction mode, either overlap or nonoverlap, relative to the zero crossing points of the fundamental AC cycloconverter output current component.

If for instance the cycloconverter load is light and the cycloconverter is loaded mainly by an output filter with a capacitive power factor, it may be desirable to operate in an overlap mode to insure continuous cycloconverter load current flow by establishing a controlled circulating current between the negative and positive converter banks at the conduction transfer points. If however, the cycloconverter load is large, and/or has a lagging power factor so that the load for the cycloconverter has a near unity or lagging power factor thereby inherently insuring a continuous current flow throughout the conduction transfer points, the bank selector circuit would work in a nonoverlap mode such that no circulating current is permitted to flow between the positive and negative banks which might introduce waveform distortion and reduce efficiency.

By operating the bank selector circuit with an overlap interval during no load or light load conditions, the bank conduction transfer becomes very smooth and the distortion which would generally be caused by discontinuity of the cycloconverter load current at the conduction transfer points is minimized.

By operating the bank selector with a short "no conduction" interval, (nonoverlap mode) at the conduction transfer points during heavy cycloconverter loads, particularly under heavy loads with lagging power factor conditions, the interbank circulating currents which are not required to maintain continuous converter current are eliminated. The circulating currents, if permitted to flow under heavy cycloconverter load conditions, would be excessive because the instantaneous difference between the output voltage of the positive and negative banks is the highest at about the voltage zero crossing point. The elimination of this large circulating current by operating the converter banks in a nonoverlapping mode, minimizes the distortion of the input voltage waveform and thus minimizes distortion in the converter output current waveform.

A bias circuit adjustably controls the degree of operation in either the overlap or nonoverlap bank conduction transfer modes as a function of the cycloconverter load conditions, including magnitude and power factor.

DESCRIPTION OF THE PREFERRED EMBODIMENT

Figure 1:
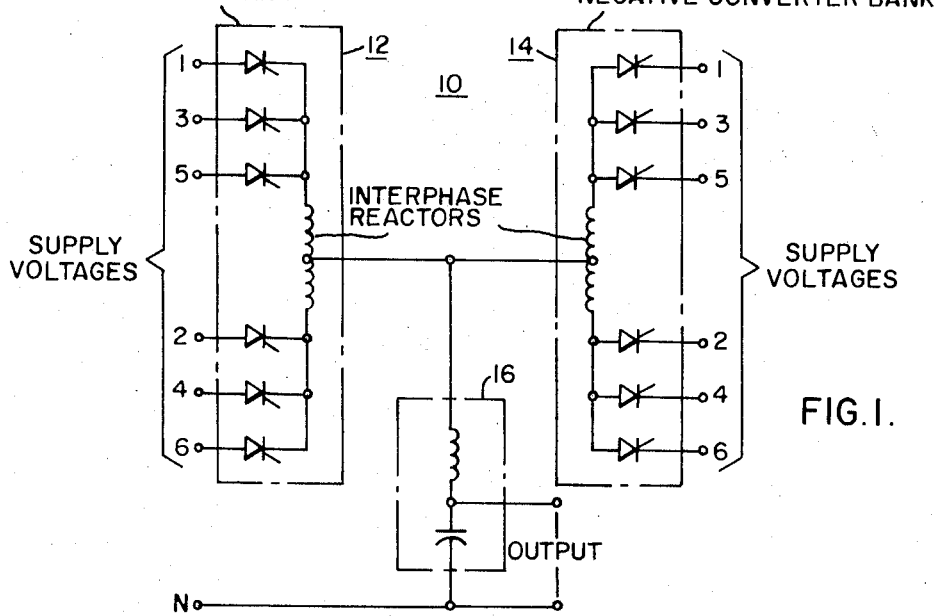
FIG. 1 is a basic schematic of a cycloconverter circuit including a positive and negative bank.

A typical six-phase to single phase cycloconverter 10 is illustrated schematically in FIG. 1. The cycloconverter 10 is comprised of essentially a pair of inversely connected converter banks, positive bank 12, negative bank 14 and an output filter 16. The programmed gating of the gate controlled switches V of the positive and negative banks by firing circuits (not shown) effectively converts the six phase supply voltages applied to the banks 12 and 14 into a single phase output waveform. The output waveform of the cycloconverter 10 is fabricated from segments of the supply voltage waveforms.

Figure 2:
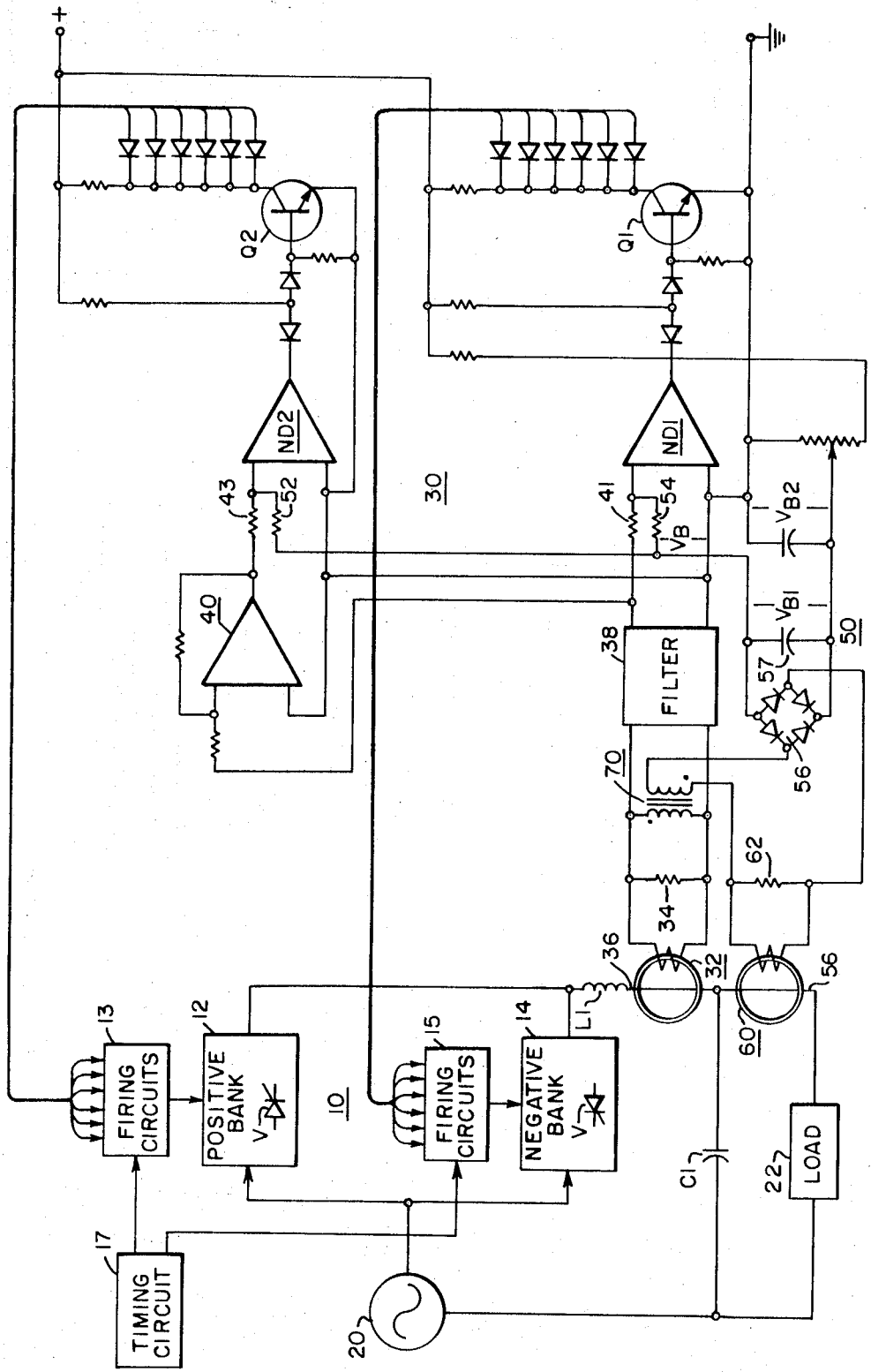
FIG. 2 is a schematic diagram of an embodiment of the invention.

Referring to FIG. 2 there is illustrated schematically a cycloconverter 10 comprising a positive converter bank 12, a negative converter bank 14, firing circuits 13 and 15 and an output filter L1-C1.

The output waveform of the cycloconverter 10 is determined by the conduction schedule of the switches V of converter banks 12 and 14 established by the firing circuits 13 and 15 respectively in response to firing circuit input pulses developed by a converter bank timing circuit 17.

The timing circuit 17 represents any one of numerous techniques for gating the switches V of the positive and negative converter banks 12 and 14 respectively to render the switches conductive in a prescribed pattern in order to fabricate the output waveform of the cycloconverter 10.

A cycloconverter bank selector control circuit 30 responds to the load characteristic such as magnitude and power factors by selectively inhibiting the conduction of the banks 12 and 14 during the negative and positive cycloconverter output current half cycles respectively to establish a conduction transfer mode, either overlap or nonoverlap, which result in minimum cycloconverter waveform distortion and optimum cycloconverter efficiency. A current transformer 32 of the bank selector control circuit 30 develops a voltage signal across resistor 34 which is proportional to the output current of the cycloconverter 10 flowing in cable 36. Filter 38 attenuates the ripple harmonics of the voltage waveform developed across resistor 34 and produces an output voltage waveform representing the fundamental component of the cycloconverter output current. The filter 38 can be a conventional tuned filter or a combination of a low pass filter and a tuned filter which exhibits no appreciable phase shift at the desired output frequency. The output current waveform of the cycloconverter 10 is illustrated as waveform A in FIG. 3 and the filtered fundamental component of waveform A is illustrated as waveform B.

Figure 3:
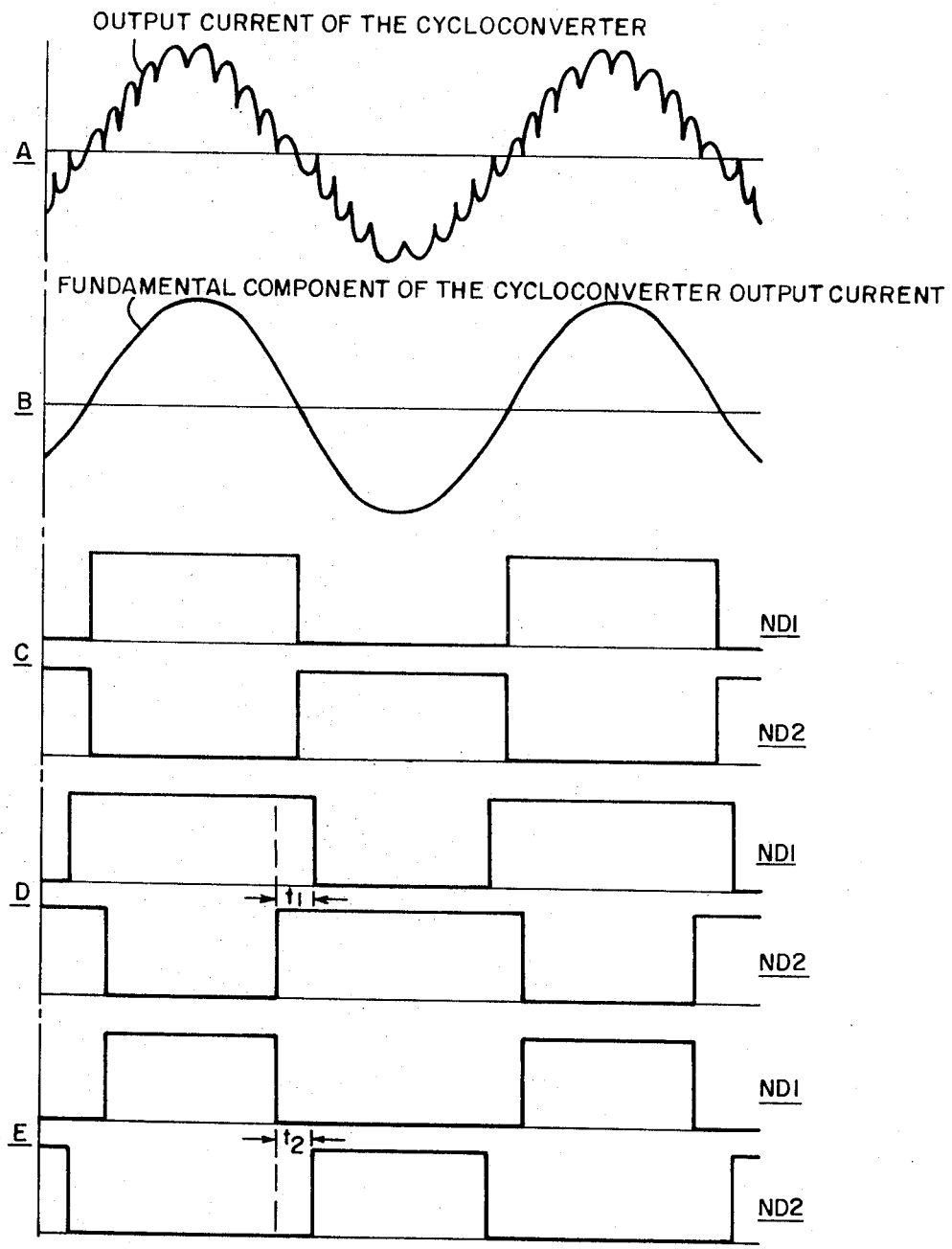
FIG. 3 is a graph of waveforms corresponding to the embodiment of FIG. 2.

The output voltage waveform of the filter 38 is applied to both a unity gain, inverting amplifier 40, and through resistor 41 to null detector circuit ND1. The inverted voltage output waveform of the amplifier 40 is applied through resistor 43 to an input of a second null detector circuit ND2. The null detector circuits ND2 and ND1 develop opposite phase square wave output waveforms which are subsequently applied to firing circuits 13 and 15 respectively to inhibit the conduction of the positive and negative converter banks 12 and 14 respectively. The basic square wave outputs of null detector circuits ND1 and ND2 in response to the AC fundamental cycloconverter waveform B of FIG. 3 are illustrated in waveforms C of FIG. 3 as symmetrical square waves of opposite phase. The square waves of the null detector circuits ND1 and ND2 coincide with the alternate half cycles of the fundamental AC waveform B, such that leading and trailing edges of the square wave output of ND1 correspond in time to the trailing and leading edges of the square wave output of ND2. The effect of the square wave output represented by waveforms C is a transfer of conduction between the switches V associated with the positive converter bank 12 and the switches V associated with the negative converter bank 14 at the instant of zero crossover of the fundamental cycloconverter output current waveform B. In this manner the transfer of conduction between the positive and negative converter banks 12 and 14 established by the bank selector control circuit 30 is precisely synchronized to the output frequency of the cycloconverter 10.

While the gating of the switches V by firing circuits 13 and 15 while bank conduction transfer in synchronization with the zero crossover points of the fundamental component of the cycloconverter output current is desirable under ideal load conditions there exist load conditions which require bank conduction transfer action other than that provided by the symmetrical square waves of waveform C to achieve optimum cycloconverter performance.

The type of load connected to the output filter 38 of the cycloconverter 10 significantly effects the mode of bank conduction established by the output waveforms of ND1 and ND2 to insure cycloconverter operation with minimum output waveform distortion. The magnitude and power factor of the load 22 determines if the symmetrical square waves of ND1 and ND2 illustrated in waveform C are appropriate or if cycloconverter performance can be improved by nonsymmetrical waveshapes such as illustrated in waveforms D and E of FIG. 3.

Waveform D corresponds to the overlap operational mode in which switches in both the positive and negative converter banks 12 and 14 are in a simultaneous conductive state for a period of time, $t_1$, relative to the zero crossover points of the cycloconverter fundamental waveform component. During the overlapping conductive period $t_1$, a circulating current is permitted to flow between the switches V of the positive and negative converter banks.

Waveform E illustrates the non-overlap of operation in which a deadband period, $t_2$, is established relative to the zero crossover points of the cycloconverter fundamental waveform component during which time the bank selector control circuit 30 inhibits conduction of switches in both the negative and positive converter banks.

Minimum cycloconverter output waveform distortion is achieved in general by maintaining a continuous cycloconverter current flow to the load throughout the AC cycle. The zero crossing point of the output current waveform represents the portion of the AC waveform at which current discontinuity is most likely to occur. While an interbank circulating current can be established to insure a continuous cycloconverter current, the presence of the circulating current can be detrimental to the operation of the cycloconverter depending on the load conditions or characteristics.

Under no load or light load conditions there is a tendency for the cycloconverter output current to be discontinuous at the zero crossing points. In this situation it is desirable to establish an interbank circulating current by utilizing the overlap mode of bank conduction transfer to insure continuous cycloconverter load current. The circulating current is small under these conditions because of small instantaneous voltage differences between the outputs of the respective converter banks.

Under heavy load conditions the ripple current of the cycloconverter is small relative to the load current and therefore the flow of the output current remains continuous at the critical zero crossing points. In this instance the interbank circulating current is not required and in fact, it may be detrimental because under these conditions there exists a relatively large difference between the instantaneous output voltage of the cycloconverter banks 12 and 14 which would result in very large circulating current that could cause distortion in the output voltage waveform and would reduce the overall efficiency of the system. Therefore bank conduction transfer in the nonoverlap mode is appropriate.

Compensations for load characteristics is provided by a voltage bias circuit 50 which develops a DC bias voltage signal $V_B$ via resistors 52 and 54 at the inputs of null detector circuits ND1 and ND2. A rectifier bridge circuit 56 develops a negative DC voltage signal $V_{B1}$ across a capacitor 57. The voltage signal $V_{B1}$ represents the difference between the voltage signals corresponding to the current flow in the cycloconverter output cable 36 and the current flow in the load circuit cable 58.

A current transformer 60 develops a voltage drop across resistor 62 which is proportional to the cycloconverter current flow in cable 56 subsequent to filtering by the output filter L1-C1. A transformer 70, connected as schematically illustrated, couples the voltage signal developed across resistor 34 by current transformer 32 in a bucking relationship with the voltage signal developed across resistor 62 to produce the voltage $V_{B1}$ at the output of the bridge circuit 56.

Under no load or light load conditions, only a small circulating current is developed because the instantaneous differences between the output voltages of the two converter banks are small, thus the bank selection mode established by the control circuit 30 may be that illustrated as waveform D as the overlap type, and the transfer of conduction between the positive and negative banks can be made smoothly with a minimum distortion caused by discontinuity of load current at the vicinity of the transfer point.

Under heavy load conditions, particularly under heavy load with lagging power factor, the circulating currents are high because the instantaneous difference between the output voltage of the positive and negative banks is at a highest point at about the zero voltage crossing point. The load current is continuous so minimum output distortion can be achieved without interbank circulating current. The operation of the control circuit in the mode nonoverlap illustrated in waveform E, in which a "no conduction interval," $t_2$, is established substantially eliminates the interbank circulating current.

The vector relationship of the current flowing in the load circuit cable 56, $I_L$, and the total cycloconverter current, $I_T$, provides an indication of the load characteristics.

Figure 4A:
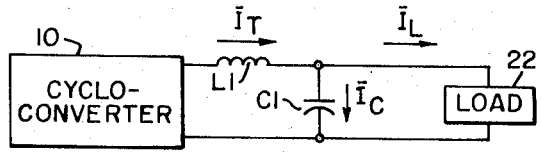
FIG. 4A is a block diagram of a cycloconverter and FIGS. 4B, 4C and 4D are vector representations of the operation of the cycloconverter under different load conditions.

There is illustrated in FIG. 4A a cycloconverter 10 and an output circuit comprising filter, L1-C1, and a load 22. The cycloconverter output current $\bar{I}_T$ is equal to the sum of the vector quantities $\bar{I}_C$ and $\bar{I}_L$. The current transformers 32 and 56 of voltage bias circuit 50 sense the magnitude of the current flow corresponding to the vector quantities $\bar{I}_T$ and $\bar{I}_L$. In the embodiment of a typical voltage bias circuit 50 of FIG. 2, a K factor (K>1) is introduced by the turns ratio (2:1) of the transformer 70 which steps down the signal developed by the current transformer 32 corresponding to the magnitude of the current $\bar{I}_T$ and effectively increases the relative magnitude of the signal developed by the signal developed by the current transformer 56 corresponding to current $\bar{I}_L$ by a factor of two. The mathematical substracting operation performed by the transformer 70 results in a current vector relationship:

$$\bar{I}_B = \bar{I}_T - 2\bar{I}_L$$

where $\bar{I}_B$ represents the current vector corresponding to the bias voltage signal $V_{B1}$ and $K = 2$. The selection of 2 as the K factor is solely for the purpose of explanation.

A fixed, positive voltage signal $V_{B2}$ is developed across resistor 80 and capacitor 82 by a voltage source (not shown). The fixed, positive voltage signal $V_{B2}$ is added to the negative voltage signal $V_{B1}$ to produce the DC bias voltage signal $V_B$. The magnitude of the bias voltage signal, $V_B$, which is supplied to the inputs of null detector circuits ND1 and ND2, varies between a positive and negative value as the characteristics of the load 22 of the cycloconverter 10 vary.

Figures 4B, 4C:
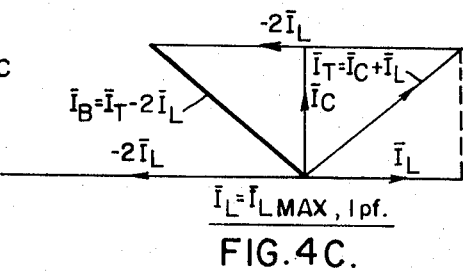
Figure 4D:
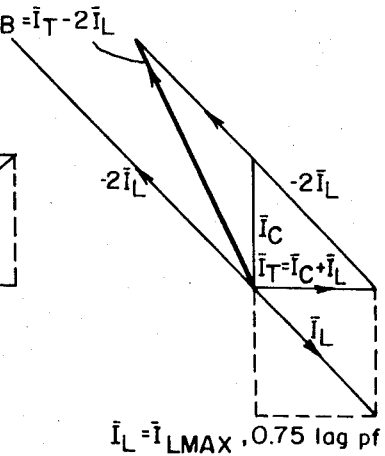

The variation of the magnitude of the voltage signal $V_{B1}$ resulting from changes in the vector relationship of the currents $\bar{I}_L$ and $\bar{I}_T$ controls the mode of conduction transfer of the converter banks 12 and 14 of cycloconverter 10 initiated by the bank selector control circuit 30. Typical load conditions and corresponding vector diagrams are illustrated in FIGS. 4B, 4C and 4D.

The bank conduction transfer signals developed at the outputs of the null detector circuits ND1 and ND2 are amplified to a suitable level by transistor amplifiers Q1 and Q2 respectively, and applied to the firing circuits 15 and 13.

It may be advantageous to use a tuned filter to generate a signal corresponding to the fundamental component of the load current. This advantage is due to the fact that this filter insures a reliable and proper operation for the basic selective circuit 30 when the converter banks 12 and 14 are operated with a "no conduction interval" at the current transfer points. It should be appreciated that in this operational mode the output current is kept zero for a finite time interval, $t_2$, and thus the bank selector circuit could not determine without an additional "memory" whether the half cycle to be started should be a "negative" or a "positive" half cycle. However, if the filter has a reasonably high Q, the input signal to the null detector is ND1 and ND2 remains continuous and thus the alternate switching of the converter banks is insured under all conditions. To complement the tuned filter with a low pass filter, though, it may be necessary in applications when large inductance loads are switched to the output of the cycloconverter 10. If this switching occurs at or about an output voltage zero point, the current transients may contain rather low frequency components which should be supplied by the cycloconverter. These components, therefore, have to be allowed to influence the bank selection.

Various modifications may be made within the scope of this invention.

I claim:

1. In a cycloconverter system having a positive and a negative bank of gate controlled switching elements, the gating of said switching elements by firing circuits converting an AC waveform of an input supply source into a desired AC output waveform for application to a load, the combination comprising, first circuit means for developing an electrical signal proportional to the fundamental component of the cycloconverter AC output current waveform, and a bank selector circuit means responsive to said first circuit means for controlling the conduction of said positive and said negative banks relative to the zero crossover points of the fundamental AC component of the cycloconverter output waveform to minimize cycloconverter output waveform distortion.

2. In a cycloconverter system as claimed in claim 1 including second circuit means operatively connected to said bank selector circuit means to control the transfer of conduction between said banks as a function of load conditions in order to maintain a continuous cycloconverter load current.

3. In a cycloconverter system as claimed in claim 2 wherein said second circuit means responds to the magnitude and power factor of the load to vary the transfer of bank conduction between an overlap mode of bank conduction and a nonoverlap mode of bank conduction as a function of the load conditions.

4. In a cycloconverter system as claimed in claim 1 wherein said first circuit means for developing an electrical signal proportional to said fundamental component of the AC output current of the cycloconverter includes a current transformer circuit for monitoring the cycloconverter output current and developing a voltage signal proportional to the cycloconverter AC output current, and a filter means operatively connected to said current transformer circuit to derive a voltage signal corresponding to the fundamental component of the cycloconverter AC output current.

5. In a cycloconverter system as claimed in claim 4 wherein said bank selector circuit means includes, a first null detector circuit means having a input and an output, said input operatively connected to the output of said filter means, a signal inverter means having an input and an output, said input operatively connected to the output of said filter means, and a second null detector circuit means having an input and an output, said input operatively connected to the output of said signal inverter means, said first and second null detector circuit means responding to alternate polarity half cycles of the fundamental AC component of the cycloconverter output waveform by generating square waves of opposite phase, the square wave output of said first null detector circuit means controlling the conduction of said positive bank, and the square wave output of said second null detector circuit means controlling the conduction of said negative bank.

6. In a cycloconverter system as claimed in claim 3 wherein said second circuit means includes a variable bias voltage circuit, said bias voltage circuit operatively connected to the inputs of said first and second null detector circuit means, said variable bias voltage circuit capable of producing zero, positive, and negative output bias voltages at the inputs of said null detector circuit means as required by the load conditions to establish a mode of bank conduction transfer sufficient to maintain a continuous cycloconverter mode current.

7. A method for minimizing the output waveform distortion of a cyloconverter having a positive and negative bank and providing AC power to a load, comprising, monitoring the load conditions, including the magnitude and power factor, and controlling the conduction of the banks relative to the zero crossover point of the fundamental component of the cycloconverter AC output current waveform as a function of the load conditions to maintain a continuous cycloconverter load current under substantially all load conditions.

8. A method as claimed in claim 7 including developing an interbank circulating current under no load and relatively light load conditions to insure a continuous cycloconverter load current.

9. A method as claimed in claim 7 including, inhibiting the development of an interbank circulating current under relatively heavy load conditions.